Patented Feb. 14, 1933

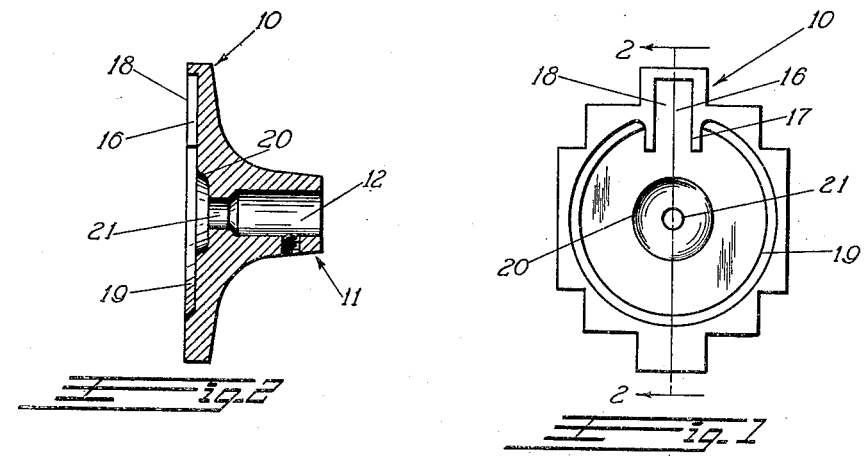
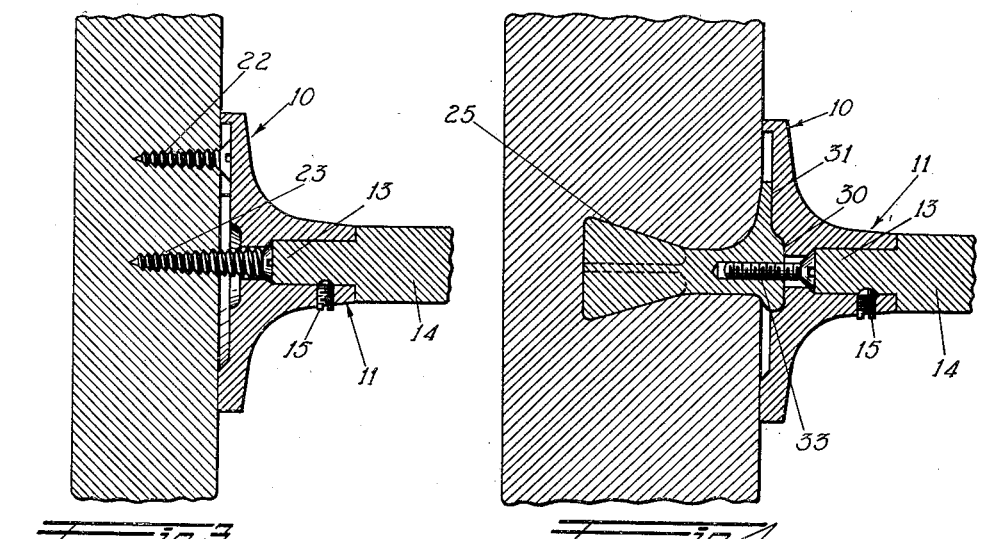
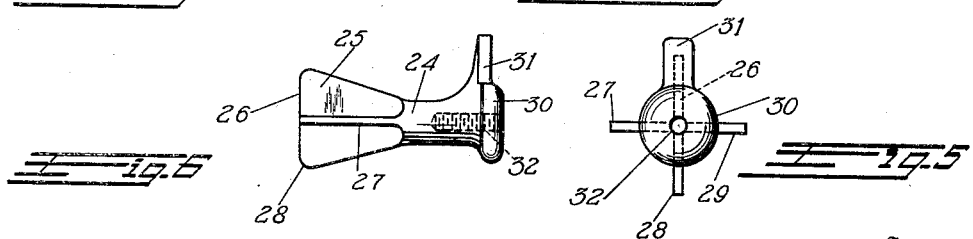

1,897,913

UNITED STATES PATENT OFFICE

JOHN PUDLINER, OF ALLENTOWN, PENNSYLVANIA, ASSIGNOR TO BREY & KRAUSE MANUFACTURING COMPANY, OF ALLENTOWN, PENNSYLVANIA, A CORPORATION OF PENNSYLVANIA

BRACKET AND METHOD OF APPLYING SAME

Application filed June 29, 1932. Serial No. 619,984.

This invention relates to an improved bracket for securing fixtures of various kinds to a wall or similar supporting surface, and to a simple method of applying the bracket to the wall or the like. The invention is intended particularly for securing bathroom fixtures to the walls of the room, though the arrangement may be used for many other purposes.

In securing bath or similar fixtures in place it is very desirable to effect the connection between the fixture and the wall by means that are invisible from the exterior of the applied fixture. One convenient way of accomplishing this result is to utilize a bracket to connect the fixture to the wall and then conceal the fastening means by means of the fixture after it has been assembled with relation to the bracket. An arrangement of this character is disclosed in my copending application Serial Number 585,572, filed January 8th, 1932. Inasmuch as a single fastener is utilized to secure the bracket to the wall, there is a possibility of rotation of the bracket with respect to said fastening means, especially when the bracket is utilized to secure a fixture that, in use, exerts a turning force upon the bracket. In order to add stability to such an arrangement it is desirable to provide some means to prevent the rotation of the bracket about the fastener that secures it to the wall. It has been heretofore proposed to utilize a projection from the bracket intended to enter a recess in the wall, as the means for preventing rotation of the bracket. This arrangement is not entirely satisfactory because it occasionally happens that the projection is caused to enter the wall in such position that the opening through which the screw that attaches the bracket to the wall is disposed at a point in the wall that is not constructed to provide a satisfactory anchorage for the fastening means. In other instances it is found, after the projection is entered in the wall, that the bracket does not lie flush against the wall because of some irregularity therein adjacent the particular point at which the projection was engaged therewith, and it becomes desirable to be able to shift the bracket to a slightly different position. Such shifting cannot be accomplished in constructions heretofore proposed, without making a further hole in the wall for the engagement of the projections on the bracket.

A primary object of this invention is to improve upon the constructions just referred to by providing an arrangement that will enable the bracket to be shifted with respect to the means that holds it from rotation, so that the bracket may be adjusted slightly in order that the fastener receiving opening may be disposed opposite a point in the wall that is adapted to satisfactorily and successfully receive the fastener, and so that the bracket may be shifted, when necessary, to bring it into a position at which it will lie flush against the wall at all points.

A further object of the invention is to provide a bracket for attaching fixtures or the like to a wall designed so that an ordinary screw threaded in the wall may be used to hold the bracket from rotation and so that the bracket may be adjusted with respect to the screw whenever it is desirable in the application of the bracket to the wall that slight adjustment be made.

Still another object of the invention is to provide a method of applying a fixture bracket having a fixture receiving socket to a wall by so applying a projection to a wall so that a portion extends away therefrom, then causing the bracket to engage the projection so that the bracket cannot rotate, then shifting the bracket with respect to the projection, whenever this action is necessary, so as to properly locate the bracket, and then securing the properly located bracket to the wall by a single fastener that is subsequently concealed when the fixture is assembled with relation to the bracket.

A still further object of the invention is the provision of a fixture bracket provided with a recess in back of the base part thereof, designed to receive a projection of an anchor secured to the wall so that rotation of the bracket is prevented.

A further object of the invention is to provide a bracket mounting in which a single fastener is utilized to secure the bracket to the wall, and in which rotation of the bracket with respect to such fastener is prevented by means of a screw.

Further objects of the invention will appear as a description thereof proceeds with reference to the accompanying drawing, in which:

Figure 1 is a rear view of a bracket fixture forming a part of the present invention.

Figure 2 is a sectional view taken on the plane indicated by the line 2—2 in Figure 1.

Figure 3 is a sectional view showing the bracket of Figures 1 and 2 secured to a wall with a fixture secured to the bracket.

Figure 4 is a sectional view showing the same bracket secured to a wall by means of an anchor inserted in the wall.

Figures 5 and 6 are respectively end and side elevational views of the anchor shown in Figure 4.

Like reference characters indicate like parts throughout the several figures.

The improved fixture bracket of the present invention consists essentially of a base part 10 and a part 11 designed to receive a fixture. Part 11 is preferably provided with a socket 12 formed to receive the shank 13 of the fixture 14, said shank being held in the socket by means of a set screw 15. Preferably the fixture is formed so that its outer surface, adjacent the portion of part 11, will form a smooth continuation of the outer surfaces of said part, so that, in appearance, the fixture and bracket that attaches it to the wall will appear as a unit, the line of division between the fixture 14 and the part 11 being thus rendered virtually invisible.

It will be understood that the bracket about to be described is intended to secure fixtures of various kinds such as towel bars, tumbler holders, toilet paper roll spindles and the like. All of such fixtures are preferably constructed with uniform shanks 13 and portions 14, so that the bracket may be used interchangeably with any one of the fixtures.

The base part of the bracket is provided with a recess 16, the side walls 17 and 18 of which are parallel providing elongated guide walls for a purpose presently to be described. Said base part is further provided with a large depression 19 and a further depression 20 that serve to lighten the construction, and at the same time provide space to the rear of the bracket in which any plaster, sawdust or the like that may be freed from the wall when the bracket is fastened thereagainst, in a manner presently to be described, and also to provide a relatively narrow bearing portion around the margins only of the base part, permitting the bracket to be readily brought into snug contact with the wall irrespective of slight irregularities therein. The bottom of the socket 12 is provided with an opening 21 to permit the passage of a screw or similar fastener in attaching the bracket to the wall.

Since the bracket is held against the wall by a single screw or fastener passing through the opening 21, it is desirable to provide some means for positively preventing rotation of the bracket about this single fastener. Heretofore lugs or projections have been formed on the bracket to accomplish this result, but as above stated, such arrangements are not entirely satisfactory in view of the fact that they require the formation of an opening in the wall, that definitely fixes the position of the bracket and that does not permit it to be adjusted when it is found, after formation of such opening, that the bracket will not lie flush against the wall because of the irregularities therein, or it is found that the nature of the wall opposite the opening 21 is not such as to permit the fastener to satisfactorily obtain a hold therein.

An important part of the present invention consists in the provision of means for preventing rotation of the bracket that will permit relatively slight shifting of the bracket with respect to the means and to provide a means that can itself be adjusted as may be required. To this end, preferably a screw 22 is utilized to constitute the means fixed to the wall for preventing rotation of the bracket. Said screw may be adjusted so that the head thereof projects away from the wall the desired extent. In applying the bracket to a wall a suitable point therein is selected and the screw 22 is applied to the wall leaving the head thereof projecting slightly away therefrom as just stated. The bracket is then brought in position opposite said screw, the projecting portion of the screw being entered in the elongated slot or recess formed between the parallel walls 17 and 18, which walls are spaced apart the width of the head of the screw. If desired, said walls may be undercut to provide a dovetail connection with the head of the screw in which event the screw 22 would serve to assist in holding the bracket against the wall. After the bracket has been assembled with respect to the screw 22 in the manner just stated, said bracket may be shifted in the direction of the length of the recess 16, if necessary, to bring the bearing surfaces of the face thereof into snug contact with the wall, which, if it is a plaster wall, may contain slight irregularities, or it may be shifted in order to bring the opening 21 therein opposite a point in the wall that is of a nature suitable for reception of the fastening screw. After the bracket has been adjusted in proper position so that it lies flush against the wall, the fastening screw 23 is passed through the socket 12, the opening 21 in the bottom thereof, and screwed into the wall, thus drawing the bracket firmly in contact therewith. After the bracket has been positioned in the manner just described, rotation thereof is prevented by the screw 22 which, it will be noted, is invisible from the exterior of the applied bracket. The fixture is then applied to the bracket, said fixture serving to conceal the screw 23 by which the bracket is secured to the wall. The set screw 15 which is disposed beneath the part 11 of the bracket where it is invisible to the ordinary observer serves to secure the fixture to the bracket.

When it is desired to secure fixtures to concrete, tile or marble walls, the bracket just described may be utilized for this purpose, though in such arrangements a wall anchor illustrated in detail in Figures 5 and 6 is preferably utilized to attach the bracket to such wall. The wall anchor illustrated in the drawing may consist of a body portion 24, which may be cylindrical or in any desired form. Projecting rearwardly of said body portion 24 is a portion 25 that gradually increases in diameter from the body 24 toward the rear end of the anchor. The portion 25 is hollowed out to lighten the weight thereof, producing four webs 26, 27, 28 and 29. These may be formed in any desired manner to insure a firm hold in the wall in which the anchor is positioned. A portion of the anchor is designed to engage the depression 20 in the bracket, said portion 30 preferably relatively snugly fitting therein. A lug 31 extends upwardly from the portion 30, said lug being formed to fit between the walls 17 and 18 of the recess 16 of the bracket. A tapped opening 32 is formed in the body of the anchor for the reception of the screw to secure the bracket thereto.

In the use of this form of the invention, the anchor is embedded in the wall so that the head 30 and lug 31 extend beyond the outer surface thereof as illustrated in Figure 4 of the drawing. In attaching the bracket to the wall, the bracket is brought opposite the portions of the anchor and the head 30 is entered in the depression 20 thereof, at the same time that the lug 31 is entered between the walls 17 and 18 of the recess 16. In this position the bore 32 in the anchor will register with the opening 21 in the bottom of the socket of the bracket, and the bracket can be expeditiously attached to the anchor by means of a screw 33. Rotation of the bracket with respect to the anchor is prevented by the snug engagement of lug 31 between the walls 17 and 18, and a portion of any weight placed upon the fixture secured to the bracket is transmitted directly to the lug by engagement of the head 30 with the walls of the depression 20, thereby relieving the screw 33 of a substantial part of said weight.

The manner of attaching the bracket is extremely simple and in view of the capability of adjustment between the bracket and the screw that prevents rotation thereof, it is possible to invariably secure a neat joint between the edges of the bracket and the wall. Nevertheless the bracket and mode of attachment are extremely simple, and the bracket can be sold at a very low cost.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a wall, a stop in the form of a screw threaded in said wall with a portion thereof protruding away from the surface thereof, a fixture bracket comprising a base part designed to lie against said wall and provided with a single fastener receiving opening and having spaced guide walls formed so as to be invisible from the exposed side of the bracket and to receive the protruding portion of said stop so that the bracket may be shifted with respect to said stop by adjustment thereof with respect to said protruding portion in the direction of the length of and between said guide walls, and a fastener passing through said opening and securing said fixture to the wall after adjustment of the bracket with respect to said stop to a position at which said fastener may satisfactorily engage said wall and at which said bracket will lie snugly against the wall.

2. In combination, a wall, a stop in the form of a screw threaded in said wall with a portion thereof protruding away from the surface thereof, a fixture bracket comprising a base part designed to lie against said wall and having a part provided with a fixture receiving socket, said bracket being provided with a single fastener receiving opening extending through said base part from said fixture receiving socket so that the fastener is concealed by the fixture when the latter is applied in said socket, said base part having spaced guide walls formed so as to be invisible from the exposed side of the bracket and to receive the protruding portion of said stop so that the bracket may be shifted with respect to said stop by adjustment thereof with respect to said protruding portion in the direction of the length of and between said guide walls, and a fastener passing through said opening and securing said fixture to the wall after adjustment of the bracket with respect to said stop to a position at which said fastener may satisfactorily engage said wall and at which said bracket will lie snugly against the wall.

In testimony whereof I affix my signature.

JOHN PUDLINER.